Sept. 28, 1965 K. A. VAN WORMER, JR 3,208,172

DISPLAYING CARD-LIKE ITEMS

Filed Oct. 29, 1962 2 Sheets-Sheet 1

INVENTOR.
KENNETH A. VAN WORMER JR.
BY
Ezekiel Wolf, Wolf & Greenfield
ATTORNEYS

Sept. 28, 1965 K. A. VAN WORMER, JR 3,208,172

DISPLAYING CARD-LIKE ITEMS

Filed Oct. 29, 1962 2 Sheets-Sheet 2

*INVENTOR.*
KENNETH A. VAN WORMER JR.
BY
*Ezekiel Wolf, Wolf & Greenfield*
ATTORNEYS United States Patent Office 3,208,172

Patented Sept. 28, 1965

3,208,172
DISPLAYING CARD-LIKE ITEMS

Kenneth A. Van Wormer, Jr., 24 Fells Road, Winchester, Mass.

Filed Oct. 29, 1962, Ser. No. 233,590
3 Claims. (Cl. 40—124)

The present invention relates in general to displaying decks of card-like items and more particularly concerns novel apparatus for conveniently and rapidly displaying edge portions of cards, such as computer tabulation cards, to permit a viewer to observe the edge portion of each displayed card of a deck simultaneously and in the same sequential order as the cards appear in the deck. In a preferred embodiment of the invention, a stack of tabulating cards may be spread out with the apparatus to display the top edge of the card containing the printed information of interest. The spread out cards may then be removed from the apparatus while still displaying each top edge so that the apparatus may be used for displaying the edge portions of another stack of cards. Thus, a single structure according to the invention, together with appropriate retaining means, relatively low in cost and light in weight, may be used to spread out virtually any number of cards.

The operation of many automatic computers depends directly or indirectly on instructions and data supplied in the form of a punched deck of tabulation cards. In many instances, such as for a source program written in the Fortran language, the top edge of each punched card contains printed indicia characteristic of the information encoded on the card when a printing model of the card punch machine is used. Either during preparation of such a source program deck or at least prior to submitting the program deck to the computer operator, it is highly desirable for the programmer to study and review his deck of punched cards, for example, to check for card sequence or to scrutinize the punched cards for any obvious errors.

In these instances the programmer can review such a program or data encoded on a deck of tabulating cards by use of mechanical machines capable of transferring such encoded information to paper, providing in sequential order a permanent printed record of the encoded information contained on each card. However, such machines are not always conveniently available, are relatively expensive, and in some cases relatively time consuming. In the event that such mechanical machines are not available to the programmer, he may still review his program by thumbing through the deck, reading the top printed edge of each card individually; or he may try spreading the deck of cards out on a table in a form suitable for study. Where relatively large numbers of cards are involved, either method is very laborious and time consuming, and ordinarily will not possess the advantages of uniform presentation and proper alignment of printed information gained through mechanical printing machines, referred to above. In still another case where the printed information on other types of cards is not simultaneously encoded on the card in punched form, for example, filing cards, the possibility of using printing machines does not exist. Moreover, there are many instances where a permanent or printed copy of encoded information is not desired, for example, when merely checking for the presence of a few specific cards or the checking for proper alignment of data fields in a deck of punched cards.

In preparing a program to be followed by the computer where the steps in the program are first encoded on punched cards, it is usually important to keep the steps of the program and the corresponding cards in a prescribed sequence. Thus, not only must a programmer seeking to review a program encoded on a stack of cards see the printed portions of each card, but he normally also wants to see the cards remain in the prescribed program sequence.

Accordingly, it is an important object of this invention to provide means for easily, rapidly and positively displaying selected edge portions of cards initially gathered in a stack, such display being made without disturbing the sequence of the cards while keeping them in columnar alignment.

It is another object of the invention to achieve the preceding object with compact apparatus relatively easy and inexpensive to fabricate and relatively light in weight so that it may be easily moved from place to place by virtually anyone with little effort or incorporated into existing types of office furniture.

It is another object of the invention to achieve the preceding objects with a structure that does not damage the cards being displayed.

It is still another object of the invention to achieve the preceding object with apparatus capable of spreading any number of stacks of cards and keeping the stacks spread out in accordance with the objects of the invention with but little additional structure, structure which is relatively low in cost and light in weight.

According to the invention, means define a display area having surface portions in a first plane. A first card support means inside the display area has a top planar start surface between a leading edge line and a trailing edge line. The distance between the leading edge line and the first plane is less than that between the trailing edge line and the first plane. A plurality of contiguous card support means within the display area immediately following the first support means each have a top planar surface for positioning each card in a plane generally parallel to the start surface. The first edge line is closer to the leading edge line than to the trailing edge line. The first edge line is closer than the second edge line to the leading edge line. All the first edge lines are included in a first edge plane parallel to and separating the first plane from the plane including the trailing edge line that is also parallel to the first plane. According to another feature of the invention, a card propelling unit is provided for moving the stack from the stack support means into engagement with the contiguous individual card support means within the display area. Means are also provided for guiding the card propelling means along the length of the array of contiguous individual card support means.

Another feature of the invention resides in forming grooves in the display area for accommodating removable rods which may be used to support the spread out cards when removing them from the apparatus described above so that this apparatus may be used to spread out another stack of cards.

Numerous other features, objects and advantages of the invention will become apparent from the following specification when read in connection with the accompanying drawing in which.

Figures 1, 2:
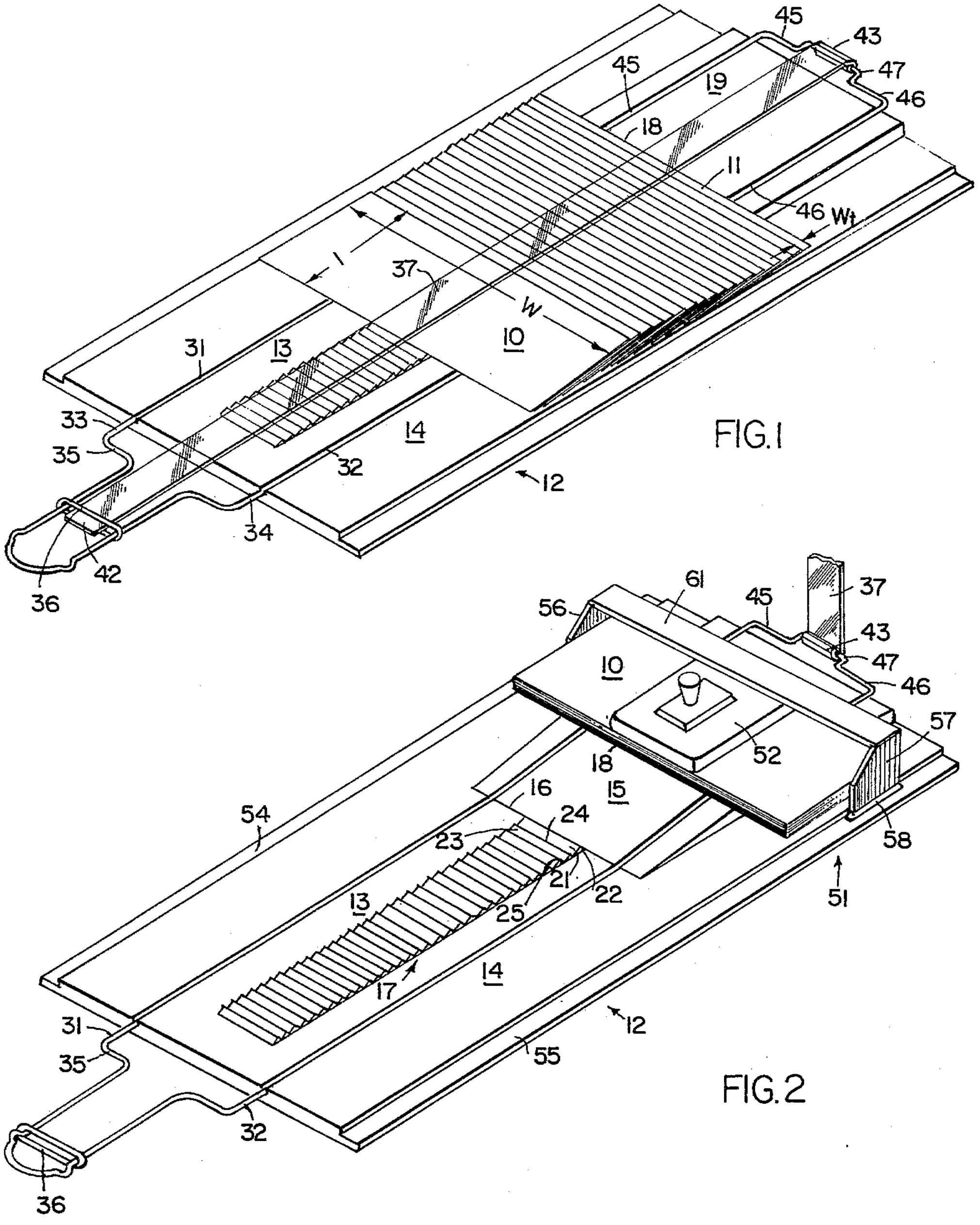
FIG. 1 is a view of the invention showing conventional computer tabulating cards spread out with the individual top edges of each card visible.
FIG. 2 is a perspective view of an embodiment of the invention showing a stack of cards in position prior to being spread.

With reference now to the drawing and more particularly FIG. 1 thereof, there is shown a group of tabulating cards like 10 spread out so that the top edge like 11 of each is visible.

Referring also to FIG. 2, there is shown a perspective view of the assembly with the cards shown spread out in FIG. 1 assembled in a stack with card 10 on top. The structure includes a display area 12, having side surface portions or platforms 13 and 14 in a generally horizontal plane. An inclined first card support or starting platform 15 is inside the display area 12 with its leading edge 16 generally adjacent to and generally flush with the horizontal surfaces 13 and 14 and sloping up to its trailing edge 18 above the plane of surfaces 13 and 14 immediately adjacent to a horizontal stack support surface or back platform 19.

Figure 4:
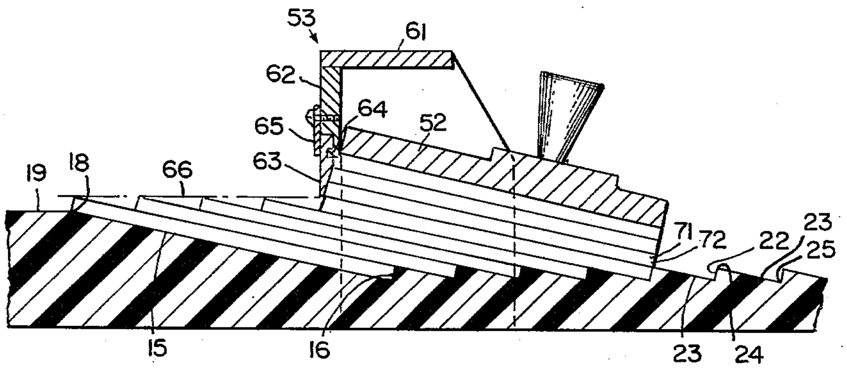
FIG. 4 is a sectional view through section 4—4 of FIG. 2 helpful in understanding details of the structure and the mode of operation of the invention.

A contiguous array of individual card support means or saw-toothed card stop unit 17 follows the starting platform 15. This array is of generally saw-tooth-shaped cross section as best seen in FIG. 4. Each individual support means like 21 comprises a front face like 22 meeting a rearwardly sloping face like 23 along a first edge line like 24. The rearwardly sloping face 23 meets the front face of the following section along a second edge line like 25.

The first edge lines like 24 of each individual card support means are included in a plane parallel to the plane of side platforms 13 and 14 and separate that plane from the plane including trailing edge line 18. That is, the first edge lines like 24 are lower than the trailing edge line 18 and above the side platforms 13 and 14.

Each front face like 22 is generally perpendicular to the sloping faces like 23 or 15. The height of each front face like 22 is preferably slightly less than the thickness of a card to be supported. The sloping width of each rearwardly sloping face like 23 is preferably equal to the width of the top edge portion of each card it is desired to expose. Each of these rearwardly sloping faces is parallel to the starting platform 15, the sloping width of the latter preferably being substantially equal to the width of a card.

The stack of cards may be manually spread out by placing the stack on starting platform 15 and applying a slight downward and rearward force to the stack so that the bottom edge of each card rests against a respective one of the front faces like 22 as the stack moves away from starting surface 19.

Figure 3:
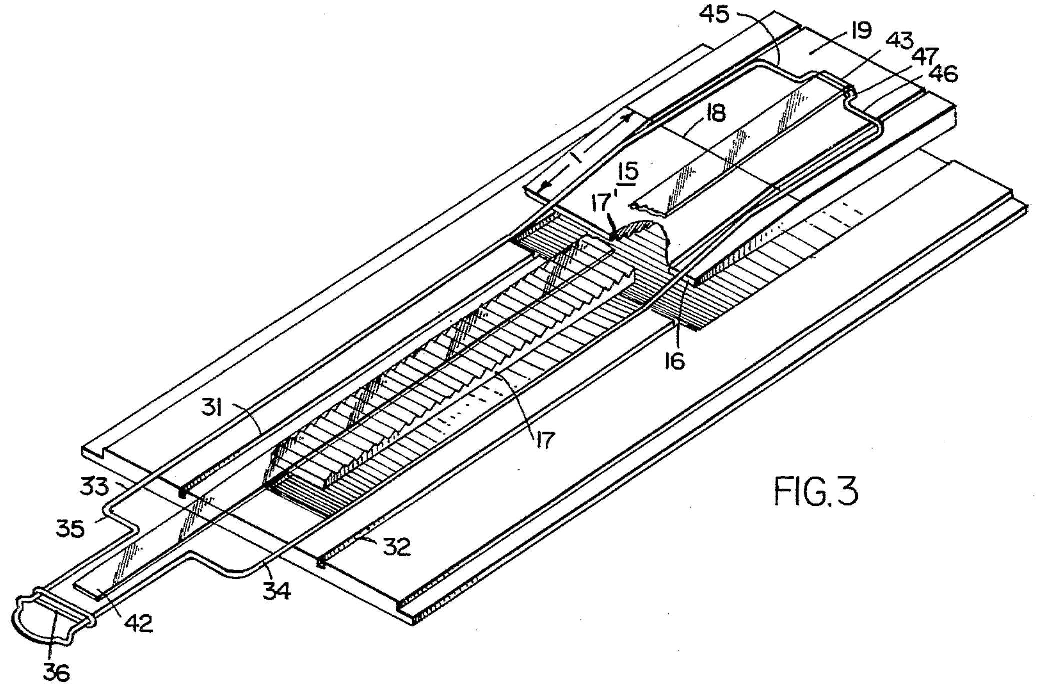
FIG. 3 is a perspective view of the invention showing a preferred choice of component parts for making up the assembly permitting easy replacement or substitution.

Preferably the structure is formed with grooves 31 and 32 along the sides of side surfaces 13 and 14 for accommodating pickup rods 33 and 34 meeting a handle portion 35. A transparent plastic strip top member 37 coacts with the pickup structure just described to clamp the spread out cards in place. The handle ring 36 slides over the end 42 of plastic strip 37 hinged at 43. As best seen in FIG. 3, the portions 45 and 46 adapted to fit in start surface 15 are formed generally parallel to that surface while the rest of the portions 45 and 46 may be generally horizontal. Then the entire assembly may be lifted to another area for study of the spread out cards by lifting handle 36.

While the cards may be spread out manually as described above, it is preferred to use a card propelling unit 51 comprising a weighted pressure or card suppressor plate 52 and a sliding pusher 53. To this end the base plate is formed with edge shoulders 54 and 55 functioning as rails where the bottom of side plates 56 and 57 terminating in runners, like 58, preferably made of Teflon or other low friction material, may slide.

The card deck suppressor plate 52 may be weighted as shown or include spring means (not shown) between plate 52 and the bottom of top plate 61.

The slide 53 is formed with a vertical back plate 62, as best seen in FIG. 4, fitted with a bottom strip or card spreading finger 63 notched for making engagement with the bottom lip 64 of back plate 62 and held in place by a strip 65 to facilitate easy replacement of strip 63, preferably made of vinyl, rubber or some other suitable flexible material to minimize wear on the cards while still applying effective pressure when spreading out the stack of cards. The tip of strip 63 preferably tapers to a thin edge just above the plane 66 including the uppermost points of the displayed cards. Strip 63 might be made of metal.

Referring to FIG. 3, there is shown an exploded view of the different component parts of a preferred embodiment of the invention. By making the following card support members 17 and the plate including the inclined initial supporting means 15 separately removable, a number of advantages result. The cascade of supporting members 17 may be replaced with an assembly with rearwardly sloping faces like 23 of different slant widths to permit exposing different widths of edge portions in a stack of cards to be spread out. Or the height of each front face like 22 may be different to accommodate cards of different thicknesses. Since it is preferred that the rearwardly sloping faces like 23 be substantially parallel to the inclined face 15, that member may be changed when assembly 17 is changed to maintain this relationship.

By forming the bottom of starting platform 15 with saw-toothed indentations 17' for mating relationship with the serrations or saw-toothed segments of unit 17, starting platform 15 may be placed closer to the front of base 12 when displaying fewer cards. By displaying the cards closer to the front, the user of the invention may examine the cards more easily.

Having described the structure of the embodiment according to the invention, it is appropriate to briefly consider its mode of operation. Place a stack of cards as shown in FIG. 2 upon the starting platform 15 beneath pressure member 52 pressing down on the cards. Then move slide 53 as best seen in FIG. 4 to the right (to the left in FIG. 1). Flexible strip 63 pushes the lowermost one of the cards, like card 71, still above the first edge lines like 24 along the following rearwardly sloping face, like 23, while the weight of pressure plate 52 keeps card 71 in contact with the rearwardly sloping face until the right edge 72 of the card rests against the front face 22. This cycle of events is then repeated for each of the remaining cards in the stack until all of the cards are displayed as shown in FIG. 1.

Assembly 17 is preferably located symmetrical about the center line of the cards as shown with a width less than that of the cards to keep the displayed cards with edges parallel without damaging the corners of the cards. The grooves 31 and 32 for accommodating the mating rods 33 and 34 are also preferably symmetrical about this center line to better support the spread out cards when removed and supported by rods 34 and 35 and top strip 37. The side plates 56 and 57 are also preferably located symmetrically about this center line.

The width of the back horizontal platform 19 may be an inch or so, or it may also correspond to the width of each card for initially supporting a deck of cards to be displayed.

The saw-toothed unit 17 is arranged so that each tooth functions as a card stop, the teeth being preferably identical. For most applications where each tooth is to stop but one card, it is preferred that the height of each tooth be less thatn or equal to the thickness of a card to insure that each tooth stops but one card.

The top edge line of each tooth preferably lies in common plane, preferably parallel to the plane of the side platforms. The shape of the teeth may take many different forms, but it is still preferable to keep the height of each tooth less than or equal to the thickness of a card.

The width of the saw-toothed portion 17 is not critical, but preferably less than the width W of each card. For displaying IBM tabulation cards, two inches was found to be satisfactory. By making this dimension less than the card width W, less propelling force seems to be required and the weight and dimensions of suppressor plate 52 may be lesss.

While a number of important features and functions have been described above, it is appropriate to review these and other features and functions, stating certain relationships believed to be desirable in connection with the best mode now contemplated for practicing the invention.

The starting platform 15 functions to start the assembled deck of cards at the proper angle relative to the plane containing the saw-toothed card stops 17 so that each card heads for a particular card stop related to the position of the card in the deck. It is preferred that the width W and length $l$ of platform 15 correspond substantially to the same dimensions of each card. The slope of starting platform 15 relative to the horizontal plane containing the card stops 17 is preferably equal to the thickness $t$ of the card being displayed divided by the top-portion width $W_t$ of each card that is visible when the deck is spread out. The vertical component $d$ of the distance between leading edge line 16 and trailing edge line 18 is thus given by $d=lt/W_t$.

While the rails 54 and 55 and runners 58 may take the form shown, it is to be understood that numerous other well-known sliding mechanisms, such as dove-tailing runners and rails, rollers, wheels on raised rails and other equivalents may be employed within the principles of this aspect of the invention.

The horizontal platform at the front of base 12 preferably has a width corresponding approximately to that of each card. This platform may be used to gather the cards in excess of those displayed on the saw-toothed portion 17.

An exemplary embodiment of this invention actually constructed has been made entirely of metal and plastic Lucite and found to work satisfactorily. It may be advantageous to use plastic material for all or part of the assembly to keep weight and costs down. The invention may be incorporated as a unit which slides out from a desk or table.

There has been described novel structure and techniques for rapidly displaying selected edge portions of a group of cards while minimizing effort, cost of fabrication and utilizing a single piece of apparatus to display many stacks of cards. It is evident that those skilled in the art may now make numerous modifications of, departures from and uses of the specific embodiments described herein without departing from the inventive concepts. Consequently, the invention is to be construed as limited solely by the spirit and scope of the appended claims.

What is claimed is:

1. Apparatus for displaying a stack of card-like elements with edge portions exposed comprising,
   means defining a start surface plane inclined at a slight angle with respect to a base plane,
   means defining a plurality of serrations following said start surface plane and coacting therewith for supporting said card-like elements in spread-out relationship with said edge portion of each element exposed and each element lying in an edge plane substantially parallel to said start surface plane, with the edge of each element comprising said edge portion lying in a plane substantially parallel to said base plane,
   means defining generally parallel grooves along each side of said serrations,
   the separation between said grooves being less than the width of each card-like element,
   a removable card supporting structure having two rods arranged to reside within respective ones of said grooves beneath the display area where the card-like elements reside when spread out and means coacting with said two rods for keeping the card-like elements when spread out over said two rods in the same fixed relative relationship to one another upon removing said card supporting structure from said grooves.

2. Apparatus in accordance with claim 1 wherein the latter coacting means comprises,
   a flexible strip of transparent material generally parallel to and between said rods.

3. Apparatus for displaying a stack of card-like elements with edge portions exposed comprising,
   means defining a start surface plane inclined at a slight angle with respect to a base plane, and
   means defining a plurality of serrations following said start surface plane and coacting therewith for supporting said card-like elements in spread-out relationship with said edge portion of each element exposed and each element lying in an edge plane substantially parallel to said start surface plane, with the edge of each element comprising said edge portion lying in a plane substantially parallel to said base plane,
   said means defining a start surface plane being removable and formed with serrations in the bottom thereof arranged for mating relationship with said first-mentioned serrations.

References Cited by the Examiner

UNITED STATES PATENTS

| | | | |
|---|---|---|---|
| 3,026,108 | 3/62 | Swing | 271—18 |
| 3,139,809 | 7/64 | Hodges | 40—124 X |

JEROME SCHNALL, *Primary Examiner.*